US009203463B2

(12) United States Patent  
Asrani et al.

(10) Patent No.: US 9,203,463 B2  
(45) Date of Patent: Dec. 1, 2015

(54) MOBILE DEVICE WITH ANTENNA AND CAPACITANCE SENSING SYSTEM WITH SLOTTED METAL BEZEL

(71) Applicant: Google Technology Holdings LLC, Mountain View, CA (US)

(72) Inventors: Vijay L. Asrani, Round Lake, IL (US); Khan Mohammed Shams, Lindenhurst, IL (US); Timothy J. Sutherland, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 26 days.

(21) Appl. No.: 14/293,013

(22) Filed: Jun. 2, 2014

(65) Prior Publication Data

US 2015/0171916 A1 Jun. 18, 2015

Related U.S. Application Data

(60) Provisional application No. 61/915,554, filed on Dec. 13, 2013.

(51) Int. Cl.
| | |
|---|---|
| *H04M 1/00* | (2006.01) |
| *H04B 1/68* | (2006.01) |
| *H01Q 1/24* | (2006.01) |

(52) U.S. Cl.
CPC . *H04B 1/68* (2013.01); *H01Q 1/245* (2013.01)

(58) Field of Classification Search
CPC ....... H01Q 1/245; H01Q 1/24; H01Q 9/0442; H01Q 5/00; H01Q 5/335; H01Q 5/314; H04B 1/68; H04B 1/0064; H04B 7/08; H04W 40/06
See application file for complete search history.

(56) References Cited

U.S. PATENT DOCUMENTS

| 5,973,646 | A | * | 10/1999 | Engblom | H01Q 1/242 343/702 |
|---|---|---|---|---|---|
| 7,889,139 | B2 | * | 2/2011 | Hobson | H01Q 1/243 343/702 |
| 8,269,674 | B2 | * | 9/2012 | Camacho | G06F 1/1616 343/702 |
| 8,270,914 | B2 | | 9/2012 | Pascolini et al. | |
| 8,615,279 | B2 | * | 12/2013 | Wong | H01Q 1/243 455/575.7 |
| 8,638,265 | B2 | * | 1/2014 | Mahanfar | H01Q 1/243 343/767 |
| 8,730,106 | B2 | * | 5/2014 | Parsche | H01Q 1/2225 343/700 MS |
| 8,774,880 | B2 | * | 7/2014 | Wong | H01Q 1/243 455/575.7 |
| 8,880,132 | B2 | * | 11/2014 | Kwon | H01Q 1/243 455/575.7 |
| 2011/0012793 | A1 | | 1/2011 | Amm et al. | |
| 2012/0071203 | A1 | | 3/2012 | Wong | |
| 2012/0112970 | A1 | | 5/2012 | Caballero et al. | |
| 2012/0329524 | A1 | | 12/2012 | Kent et al. | |
| 2013/0135157 | A1 | | 5/2013 | Tsou et al. | |
| 2013/0217342 | A1 | | 8/2013 | Abdul-Gaffoor et al. | |

* cited by examiner

Primary Examiner — Meless Zewdu  
(74) Attorney, Agent, or Firm — Faegre Baker Daniels LLP (57) ABSTRACT

A mobile communication device is provided having a peripheral metal bezel made up of a plurality of metal segments. At least one of the metal segments on the bezel is configured to be a main antenna that is connected to a transceiver circuit via an antenna matching circuit. Proximate to the main antenna is another metal segment on the metal bezel that is configured to be a capacitance proximity sensor. The capacitance proximity sensor, in conjunction with a capacitance sensing circuit provide information to the circuitry within the mobile communication device to tune the antenna matching circuit to impedance match the transceiver with the antenna.

18 Claims, 5 Drawing Sheets

MOBILE DEVICE WITH ANTENNA AND CAPACITANCE SENSING SYSTEM WITH SLOTTED METAL BEZEL

TECHNICAL FIELD

The following disclosure relates to a mobile communication device. More particularly, the following disclosure relates to a portable communication device having capacitive sensitive areas that sense a capacitive touch by a user or other object.

BACKGROUND

Portable communication devices, such as mobile phones, personal digital assistants (PDAs) and tablets have become extremely popular and for many users are considered indispensable.

One of the most important components of portable communication devices (hereinafter referred to as "UE"s) are their antennas, which are configured to radiate and receive electromagnetic waves so as to transmit and exchange wireless information signals between the UE and other locations. Such antennas must be designed to work with multiple frequency bands such as those used in the present wireless communication networks. Wireless communication device users continue to demand increasingly thinner, lighter and miniaturized devices. Such demands place additional physical limitations on the antennas used in portable wireless communication devices. As a result, multi-band antenna design continues to become more difficult.

The housings of portable communication devices may accommodate one or more antennas that support wireless communications. UEs may use long-range wireless communication systems such as cellular telephone systems, to send and receive communications. Such cellular or other long-range wireless communication systems may include, the Global System for Mobile Communications (GSM) telephone bands, Enhanced Data rates for GSM Evolution (EDGE); General Packet Radio System (GPRS); CDMA, such as IS-95; CDMA2000; WCDMA or Universal Mobile Telecommunications System (UMTS); Fourth Generation Long Term Evolution (LTE); other wide area network communication systems; PrivateMobile Radio (PMR); Worldwide Interoperability for Microwave Access (WIMAX); WLAN; other 3G or 4G networks; or the like. UEs may also use short-range wireless communication protocols to support communications with nearby devices, including Wi-Fi (IEEE 802.11) and Bluetooth devices.

The positioning and location of antennas present additional challenges for UE's having ever smaller housings and thicknesses. Handheld communication devices have largely abandoned antenna designs having the antenna project outward from the housing. Mobile communication device housings are routinely designed with internal antenna elements. However, antennas that are positioned within or along an edge of the device housing, the presence of a user's hand can degrade antenna performance. Regardless, antennas are routinely located along an edge of the device housing despite the increased likelihood of these detrimental effects.

BRIEF DESCRIPTION OF THE DRAWINGS

For a more complete understanding, reference is now made to the following description taken in conjunction with the accompanying Drawings in which.

DETAILED DESCRIPTION

The illustrated embodiments provide a method and communication device that implements an antenna and capacitive sensing system associated with a slotted metal bezel about a periphery of the front and/or back side of a mobile communication device ("UE"). The bezel may be a slotted metal band having segments configured to operate as integrated antenna, capacitive sensors used to provide antenna impedance correction, and in some embodiments, UE volume up/down functionality or other user interface controls for the UE. The bezel may include cosmetic features that enhance the look of the mobile communication device. The capacitive sensing or proximity sensing system takes up a minimal amount of space within the UE and, among other things, helps mitigate detuning of one or more of the UE's antenna due to the proximity of objects with the antenna segments. In addition, the proximity sensing system helps with transmit power reduction due to mismatched impedance between a transceiver and the antenna. According to one or more embodiments, the capacitance sensors provide an exemplary UE the ability to carry out antenna tuning, which compensates for antenna detuning caused by the presence of an object that is detected by a capacitive touch of a proximity sensor adjacent to an antenna element. A capacitive sensor segment of the metal bezel propagates object detection signals associated with a detected object to a capacitance sensor circuit. In response to receipt of the object detection signals, the capacitance sensor circuit sends detection signal information to an application processor (processor). Both object detection and antenna tuning logic is performed by application software running on the processor. The processor processes the detection signal information to generate tuning control signals to trigger compensatory antenna tuning, based on pre-established associations of object detection signal data and antenna tuning states. The tuning control signals provided by the processor indicate, at least, a level of compensatory antenna impedance tuning. The processor provides the tuning control signals to the antenna matching circuit where the tuning control signals are used to provide corresponding antenna tuning.

In the following detailed description exemplary embodiments are provided and described in sufficient detail to enable those skilled in the art to practice this disclosure. It is to be understood that other embodiments may be utilized and that logical, architectural, programmatic, mechanical, electrical and other changes may be made without departing from the spirit or scope of the present disclosure. The following detailed described is, therefore not to be taken in a limiting sense, and the scope of the present disclosure is defined by the appended claims and equivalents thereof.

Within the descriptions of the different views of the figures, similar elements are provided similar names and reference numerals as to those of previous figures. The specific numerals assigned to the elements are provided solely to aid in the description and are not meant to imply any limitations (structural, functional or otherwise) on the described element.

Is understood that the use of specific component, device and/or parameter names, such as those of executing utility, logic, or firmware described herein, are for example only and not meant to imply any limitations on the described embodiments. The embodiments may thus be described with different nomenclature or terminology or acronyms utilized to describe the components, devices and parameters herein, without limitation. References to any specific protocol or proprietary name in describing one or more elements, features or concepts of the embodiments are provided solely as examples of one implementation, and such references do not limit the extension of the claimed embodiments to embodiments in which different element, feature or concept names are utilized. Thus, each term utilized herein is to be given its broadest interpretation given the context in which that term is utilized.

As further described below, implementation of the functional features of the disclosure described are provided within processing devices/structures and can involve use of a combination of hardware, firmware, as well as several software-level constructs (e.g., program code) that are executed by a processing device to provide a specific utility for the device presented figures illustrate both hardware components and software/logic components within exemplary communication device architecture.

Figure 1:
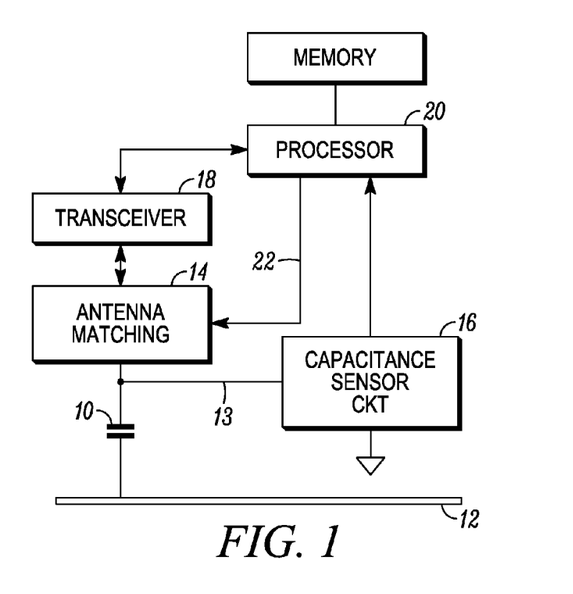
FIG. 1 illustrates a block diagram of a prior art capacitance sensor and compensation circuit for a mobile communication device.

With conventional techniques, an external antenna 12 of a portable communication device may be provided by an elongate metal segment. FIG. 1 shows a prior art design wherein a cut-out portion of the bezel is acting as an antenna. When a user's hand is close to or touching the antenna 12, the antenna 12 is subjected to parasitic capacitance that may cause a resonant frequency shift of the transmit/receive signal as well as an increase in the return loss of the antenna. To detect a change in the capacitance on the capacitance sensor line 13 to the proximity of a user's hand, the design shown in FIG. 1 requires a capacitor 10 connected between the antenna 12 and an antenna matching circuit 14. Additionally, a capacitance sensor circuit 16 is connected to the antenna signal between the capacitor 10 and the antenna matching circuit 14. The capacitance sensor circuit 16 senses a change in the capacitance associated with the antenna 12 when, for example, a user's hand is close to or touching the antenna 12. Upon sensing an appropriate change in capacitance, the capacitance sensor circuit 16 provides a signal to a microprocessor circuit 20. The microprocessor circuit 20, in turn, provides a capacitance adjustment signal 22 to the antenna matching circuit 14 to adjust the impedance between the transceiver 18 the antenna 12 to compensate for the capacitance change caused by the user's hand.

One problem with the configuration of FIG. 1 is that the capacitance of capacitor 10, which is in the 5 to 10 pF range and acting as a high pass filter, is added to the inherent capacitance associated with the capacitance sensor circuit 16 because the capacitor 10 and the capacitance sensor circuit 16 are essentially connected in parallel. Thus, the capacitor 10 when in combination with the capacitance sensor circuit 16 must be a smaller value thereby affecting the functionality and efficiency of the antenna 12 to transmit/receive at the frequencies used in wireless telecommunication. Additionally, the connection of the capacitance sensor circuit 16 directly to the received or transmitted signal between the capacitor 10 and the antenna matching circuit 14, by itself, also affects the transmission and reception of the communication signals.

What is needed is a method and design that compensates for external antenna capacitance shifts due to a user's hand or other object being close to or touching an external antenna of a UE.

Figure 2A:
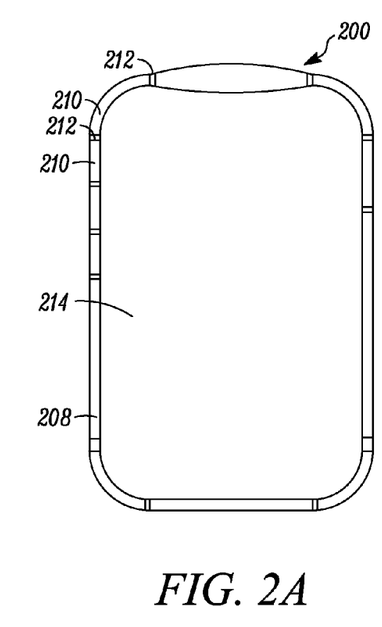
FIGS. 2A and 2B illustrate the backside and front side views of an exemplary mobile communication device.
Figure 2B:
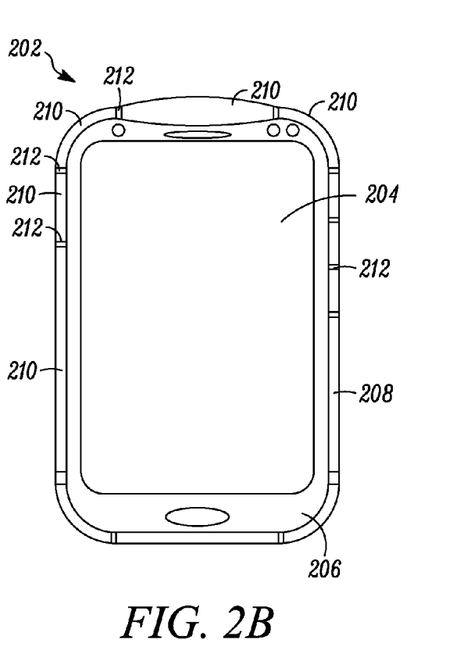

With specific reference to FIGS. 2A and 2B, there is depicted a backside 200 and front side 202 of an exemplary UE. The front side 202 comprises a visual display 204 and is configured to operate as a user interface for displaying information and images to a user as well as being touch sensitive so that a user may enter information into the UE device. About the visual display 204 is a framing area 206. The framing area is normally made of non-conductive material and may incorporate coverings or openings for microphones, speakers, LED lights, camera lenses, buttons or switches, sensors or other items relative to the operation of the UE via its user interface and other components of the UE.

About the periphery of the front side 202 is a slotted metal bezel 208. The slotted metal bezel 208 is comprised of a plurality of metal segments 210 each separated by a non-conductive spacer portion, gap or slot 212. Each of the plurality of spacer portions, slot or gap comprises a non-conductive material such as a plastic, polymer, resin, ceramic or other non-conductive material for electrically separate each of the plurality of metal segments.

Similarly, the backside 200 of the UE, which may have a smooth, roughened or contoured plastic, wooden, ceramic or other non-conductive covering 214, also comprises the slotted metal bezel 208 about its periphery. In some embodiments, the slotted metal bezel may be used to aid in removably attaching the front side 202 to the backside 200. Additionally, the slotted metal bezel 208 may provide a pleasing premium look to the UE. In some embodiments, the back side covering 214 may be made of a metallic, stainless steel, or other conductive or partially conductive material. When the back side covering 214 is made of a conductive material, the backside 214 will be electrically insulated from the metal bezel 208. The front side and the back side may be configured to attach to each other about their perimeters or periphery. When the front and back side are attached, they may form a casing or shell that contains the UE's circuitry and hardware.

Various selected ones of the metal segments 210 are configured to operate as external antennas about the outside of the UE. By providing antennas on the outside of the UE, there is the potential for the antennas providing better reception and transmission then antennas positioned inside the UE. Additional room or space is established inside the UE when the antennas are configured to be on the outside exterior of the UE and part of, for example, the external slotted metal bezel 208. There is one drawback of having external antenna in that a user of the UE will often touch or hold the UE in a manner so that their hand is touching or is very close to touching one of the external antennas.

As discussed in FIG. 1, when a capacitance sensor circuit 16 is connected directly to the antenna path between the capacitor 10 and the antenna matching circuit 14, the capacitance of a user touching the antenna 12 can be detected so that any detuning and negative effects of the sensed capacitance can be compensated or corrected. But, the capacitance sensor circuit 16 also has a detrimental, inefficient, power lowering effect on the received or transmitted signal. Thus, it would be advantageous to provide an external antenna without having the decoupling capacitor 10 and capacitance sensor circuit 16 connected to the antenna signal line between the external antenna and the antenna matching circuit 14 so that the signal loss associated with the capacitor 10 and the capacitive sensor circuit 16 are eliminated.

Figure 3:
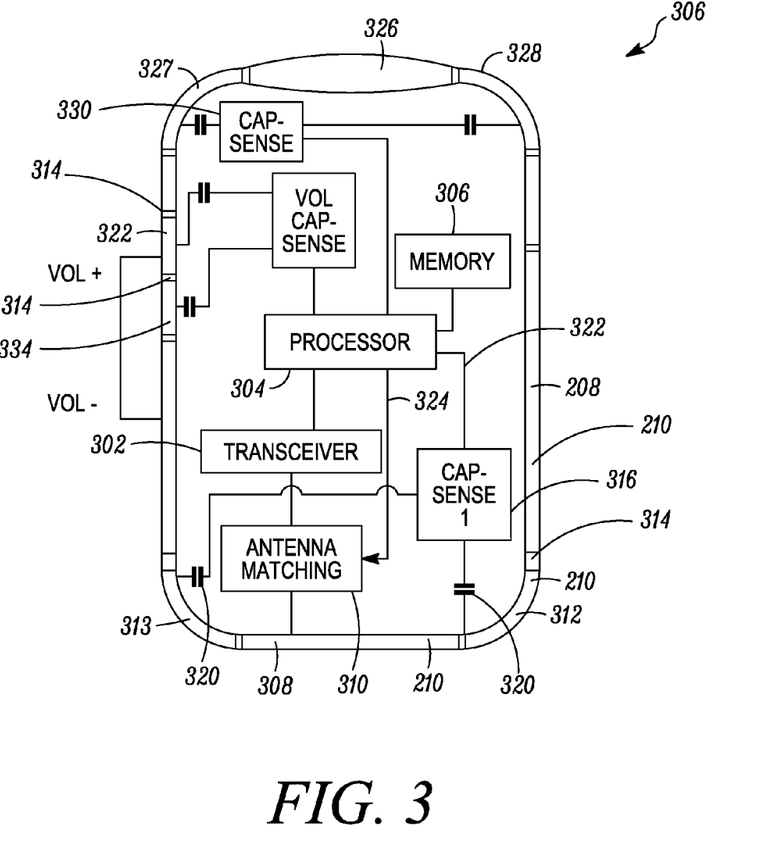
FIG. 3 illustrates a block diagram of an exemplary mobile communication device.

Referring now to FIG. 3, an exemplary UE 300 is shown in block diagram form looking into the back of the UE with the back side cover removed. An exemplary UE 300 is a mobile communication device, such as mobile phone, smart phone, laptop, netbook, tablet computer or similar device. The UE 300 can be any type of wireless communication device with a transceiver that includes a two-way radio communication device. The UE 300 comprises an applications processor (processor) 304 and memory 306 configured to store, among other things, application software and data utilized by the processor 304 to perform various mobile communication device related functions. The UE 300 includes a radio frequency (RF) transceiver integrated circuit (IC) 302 that enables the UE to send and receive communication signals.

The transceiver 302 is configured to send and receive signals wirelessly. The wireless communication signals are sent or received via one or more antennas such as the main antenna 308. The number of antennas can vary from device to device, ranging from a single antenna to five or more antennas. The UE 300 further comprises an antenna matching circuit 310, which is configured to match the impedance between the transceiver 302 and the antenna 308 based on the signal frequency and whether a capacitive proximity sensor 312 proximate to the antenna 308 is sensing the presence of a capacitive touch on or near the capacitive proximity sensor 312. The antenna matching circuit 310 is directly electrically connected to the external main antenna 308.

The external main antenna 308 is one of a plurality of metal segments 210 within the metal bezel 208 that extends about the periphery or perimeter of the back and/or front sides of the UE 300. The metal bezel 208 may form a perimeter band that is attached to and extends about the substantially about the entire perimeter of the front side or back side of the UE. The capacitive proximity sensor 312 is comprised of another one of the plurality of metal segments 210 within the metal bezel 208. Each one of the plurality of metal segments 210 are separated by a non-conductive spacer portion, a slot or a non-conductive gap 314.

The capacitive proximity sensor 312 is in close proximity to antenna 308. In various embodiments, the capacitive proximity sensor 312 is a metal segment on the metal bezel 208 next to one end of the main antenna 308. The capacitive proximity sensor 312 is electrically connected to a capacitance sensor circuit 316 via a fixed capacitor 320. When an object, such as a user's hand, touches or is in about 8 mm to 10 mm of the capacitive proximity sensor 312 (i.e., provides a capacitive touch) the capacitance sensor circuit 316 senses a change in capacitance at the capacitive proximity sensor 312. In response the change in capacitance, and in some embodiments if the change in capacitance is greater than a predetermined amount of change, the capacitance sensor circuit 316 provides a detection signal 322 to the processor 304. The detection signal 322 may indicate which capacitive proximity sensor sensed the change and the amount of capacitance sensed. The processor processes the detection signal information to generate a tuning control signal 324, which is provided to the antenna matching circuit 310. The antenna matching circuit 310 is configured to use the tuning control signal 324 to adjust the impedance of the antenna matching circuit 310 in order to better match the impedance of the antenna 308 (combined with the sensed capacitance or a derivation thereof provided from the capacitive proximity sensor 312) with the transceiver 302 and provide corresponding antenna tuning.

In some embodiments the capacitive proximity sensor 312 is referred to as the left-hand capacitance sensor 312. Another capacitive proximity sensor 313, which is also a metal segment of the slotted metal bezel and proximate to the other end of antenna 308, is referred to as the right-hand capacitance sensor 313. Thus, there is a right-hand capacitance sensor 313 and a left-hand capacitance sensor 312 proximate to either side of the main antenna 308. The right-hand capacitance sensor 313 is also connected to the capacitance sensor circuit 316 via a capacitor 320 and operates according to similar principles.

It was found through experimentation that when a user holds an exemplary UE in one of his/her hands, there is a high probability (greater than about 75%) that the palm or other part of the user's hand that is holding the UE will touch a lower corner area of the UE being held. When the user holds the UE in his/her left hand, the lower left corner portion of the UE is generally in contact with the user's left hand. Alternatively, when the user is holding the UE in his/her right hand, the lower right corner portion of the UE is generally in contact with the user's right hand. In most circumstances when the UE is held in one of the user's hands, the hand holding the UE will also be touching or in close proximity to the main antenna 308.

Gaps electrically insulate the main antenna 308 from both the left and right hand capacitance sensors 312, 313. Since the left and right hand capacitive sensors 312, 313 are adjacent to and proximate to the main antenna 308, when the user is holding the UE in one hand, either the left or the right capacitive sensors 312, 313 will be in contact with the user's hand and signal the capacitance sensor circuit 316 to send a detection signal 322 to the processor 304. If the user is not holding the UE, for example if the UE as operating in speakerphone mode and the user is not touching the UE, neither the left nor right hand capacitance sensor 312, 313 will initiate the capacitance sensor circuit 316 to provide a detection signal 322 indicative of the left or right hand capacitive sensors 312, 313 being capacitively touched.

In some embodiments, the capacitance sensor circuit 316 determines and provides an indication of the amount of capacitance being sensed at a capacitive proximity sensor 312 or 313. The capacitive sensor circuit 316 can send the processor, via the detection signal line 322, an indication of the amount of capacitance (or the amount of capacitance change) being sensed. Upon receiving the indication of the amount of capacitance being sensed, the processor 304, running an application to perform predetermined calculations and/or using a lookup table, provides tuning control signals to the antenna matching circuit 310 to provide corresponding antenna tuning impedance matching to compensate for the user's hand being proximate to or touching the main antenna 308.

In some embodiments, where there is a secondary antenna (which may be a diversity antenna or multiple-input and multiple-output (MIMO) antenna) 326 incorporated as another metal segment in the metal bezel 208 about the periphery of the front side and or backside the UE 300, there may also be additional capacitive proximity sensors 327, 328 located adjacent to and proximate both sides of the secondary antenna 326. Capacitive proximity sensor 327 may also be referred to as a top right-hand capacitance sensor 327 and capacitive proximity sensor 328 may also be referred to as a top left-hand capacitance sensor 328. Each of the top right-hand and top left-hand capacitive sensors 327, 328 are connected via a capacitor to a second capacitance sensor circuit 330. The second capacitive sensing circuit 330 provides a second detection signal 322 to the processor 304, which operates on the second detection signal along with an associated processor application to provide appropriate second tuning control signals (not specifically shown) to a second antenna matching circuit (not specifically shown) connected directly to the secondary antenna 326 so as to impedance match the differential signal coming to/from the transceiver (connection not specifically shown) with the secondary antenna 326.

In some embodiments the second capacitance sensor circuit 330 is combined with the first capacitance sensor circuit 316.

Embodiments enable the transceiver 302 to connect directly to the antenna matching circuit 310 and the antenna matching circuit to connect directly to the main antenna 308 without any connections or other circuitry components between. Connecting the antenna matching circuit 310 directly to the main antenna 308 (without a capacitor there between) provides a more efficient and straightforward technique for impedance matching the transceiver with the antenna 308. Embodiments provide a means for compensating for capacitive objects or touches that are close to or proximate to (and often contact) the main antenna 308. The means for compensating may comprise a plurality of capacitance proximity sensors positioned adjacent to either side of the main antenna and separated from the main antenna on either side by a non-conductive spacer portion or gap.

Still referring to FIG. 3, additional capacitive proximity sensors may be incorporated into one or more of the plurality of metal segments of the metal bezel 208. Such additional capacitive proximity sensors may be utilized to enable the user to interface with the UE and control one or more UE functions. For example, the user may touch a proximity sensor to turn on, off or adjust a UE device function or application. Physical volume up/down buttons of prior art UE devices can be replaced with capacitive proximity sensors that are flush with and incorporated into the metal bezel without requiring any moving parts, such as mechanical switches, that may wear out with use.

A volume up capacitive proximity sensor 332 and a volume down capacitive proximity sensor 334 can be incorporated into two adjacent metal segments on the slotted metal bezel 208. The volume up sensor 332 and the volume down sensor 334 each have a non-conductive gap 314 interposed on both sides of their respective metal segments. Each of the volume up and down sensors 332, 334 may be flush with the surface of the metal bezel 208 and/or may have braille-like bumps or other markings so a user's fingertip can easily locate them. The volume up and volume down capacitive proximity sensors 332, 334 are each electrically connected to a fixed capacitor 333, 335 and then to a volume capacitive sensor circuit 338. The volume capacitive sensing circuit 338 provides a volume change detection signal (i.e., a capacitive detection signal) 339 to the processor 304. The processor 304 runs a volume-up-down application configured to increase or decrease the volume of an audio output (not specifically shown) of the UE in accordance with receipt of the volume change detection signals 339. In some embodiments the user may double tap (e.g., quickly touch twice) one of the volume up or down capacitive sensors to indicate to the volume-up-down processor application that the user would like to change a volume setting of the UE. After double tapping the volume up or down capacitive sensors, the user may hold his finger on the volume up capacitive sensor to increase the volume or hold his finger on the volume down capacitive sensor to decrease the volume. In other embodiments the user may slide his finger from the volume down sensor to the volume up sensor indicating that the user would like to increase the volume and vis-à-vis to indicate that the user would like to decrease the volume.

An additional embodiments, when the UE is operating in a non-mobile communication mode, such as for example a camera mode, the capacitive proximity sensors incorporated into the metal bezel may alternatively be used to control zoom, flash on/off, or to take a picture in camera mode. In video or music playback mode, the capacitive proximity sensors can be used for play, stop, fast-forward, pause, rewind or other user commands. In alternative embodiments, the capacitive proximity sensors can be set to function in accordance with user-defined functions or with user selected applications that operate on the UE.

Additionally, since the left and right hand capacitance sensors 312, 313 can be used to determine, with a high probability of accuracy, whether the user is holding the UE with his/her right or left hand, an application operating on the UE can be configured to be ergonomically configured for use by the thumb of the hand holding the UE and the pointer finger of the hand that is not holding the UE based on sensing which hand is holding a UE.

Figure 4:
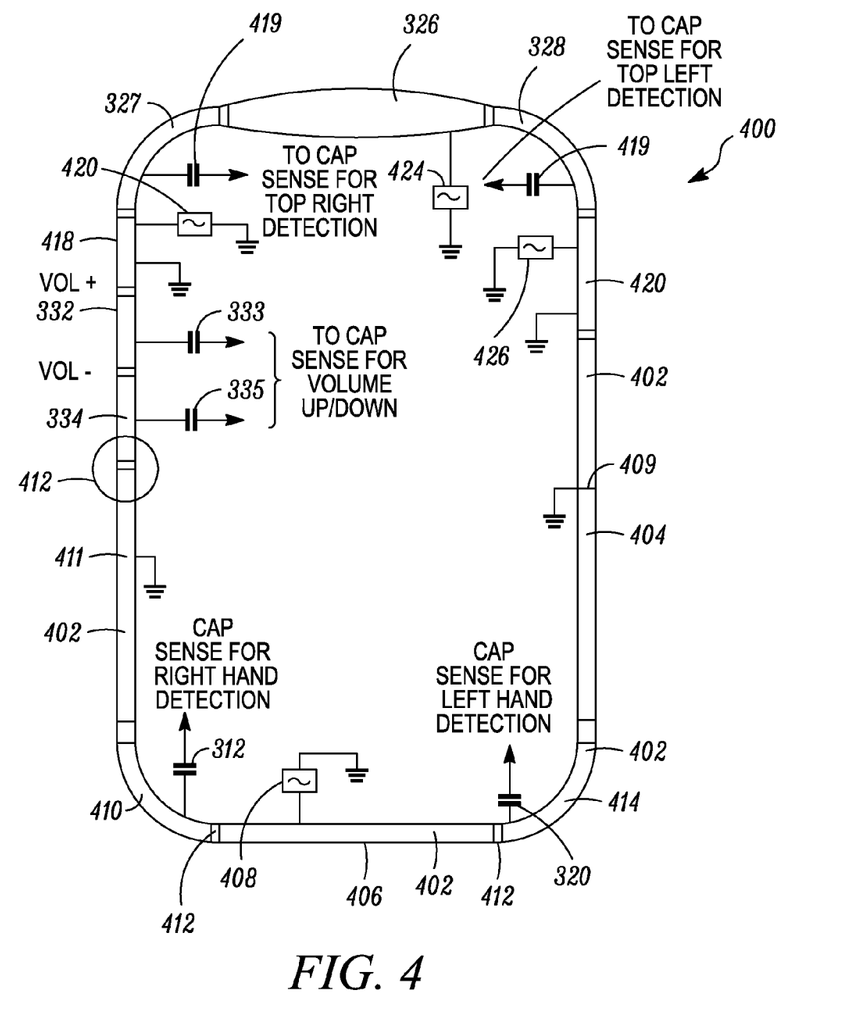
FIG. 4 illustrates a simplified electrical diagram of exemplary electrical connections to a plurality of metal segments making up a bezel about the periphery of a mobile communication device.

FIG. 4 provides a back view of an exemplary UE 400 with a simplified connection diagram for the plurality of metal segments 402 that make up an exemplary metal bezel 404 about the periphery of the backside of the UE 400. A first metal segment 406, of the plurality of metal segments 402, is the main antenna for the UE 400. Although not specifically shown, this main antenna 406 is directly electrically connected to an antenna matching circuit without other elements or electrical node connections there between. Shown is the main antenna 406 being connected to a main signal transceiver circuit 408. The main signal transceiver circuit may generate or receive a wireless communication signals for use in long-range wireless communications such as cellular telephone communication to communicate using cellular telephone band in the low frequency bands i.e. 700 MHz, 850 MHz, and 900 MHz, as well as in the high frequency bands i.e., 1800 MHz and 1900 MHz, 2100 MHz and 2600 MHz (e.g., the Long Term Evolution (LTE) or the main Global System for Mobile Communications or GSM cellular telephone bands). A second metal segment 410, of the plurality of metal segments 402, is a capacitive sensing segment for right-hand detection (i.e., sensing that the user's right-hand is holding the UE with the user looking at the front side). The second metal segment 410 is positioned to the left of and adjacent to the main antenna (the first metal segment) 406. In the embodiment shown, the second metal segment 410 is in the lower left corner area of the backside. The second metal segment 410 is separated from the first metal segment 406 by a non-conductive spacer portion incorporated into the slotted metal bezel 404 as a slot or gap 412 in the metal bezel 404. The slots or gaps 412 in the metal bezel 404 are filled with a non-conductive material. On the right-hand side of the main antenna (first metal segment) 406 is a third metal segment 414, of the plurality of segments 402. The third metal segment 414 is a capacitive sensing segment for left-hand detection (i.e., sensing that the user's left hand is holding the UE with the user looking at the front side). Additionally, the third metal segment 414 is positioned in the lower right corner area of the backside and separated from the first metal segment 406 by a nonconductive spacer portion incorporated into the slotted metal bezel 404 has a slot or gap 412.

Moving clockwise around the slotted metal bezel 404 from the second metal segment 410 is another one of the plurality of metal segments 402. In some embodiments and as explained in more detail below, each one of the plurality of metal segments 402 that is not connected to particular circuitry within the UE, may be electrically grounded to the UE.

A volume down capacitive sensing segment 334 and a volume up capacitive sensing segment 332 are shown with each segment connected to its own fixed capacitor 335, 333 prior to being connected to the capacitive sensing circuit for volume up and down. Another metal segment, of the plurality of metal segments 402 is configured to be a GPS antenna 418, which is connected both to a GPS signal receiver 420 and to ground because the GPS antenna is a loop antenna. The GPS signal receiver 420 is also connected to the processor and other necessary circuits within the UE is as is known in the art for receiving GPS signals.

In the upper left and right hand corners of the backside of the UE are a top right capacitive sensing segment 327 and a top left capacitive sensing segment 328. Each segment 327, 328 are connected via a fixed value capacitor 419 to a capacitance sensor circuit as discussed above. A diversity antenna or MIMO antenna 326 is configured from another one of the plurality of metal segments 402 and connected appropriately to a signal transmitter/receiver circuit 424. Yet another external antenna that is part of the slotted metal bezel on the exterior of the UE's periphery is a Bluetooth (BT) and/or Wi-Fi antenna 420. The Bluetooth and/or Wi-Fi antenna 420 is connected to appropriate circuitry 426 within the UE for sending and receiving short-range wireless communications with nearby equipment using the Wi-Fi (IEEE 802.11) bands at 2.4 GHz and 5 GHz (sometimes referred to as local area network bands) and the Bluetooth band at 2.4 GHz. The Wi-Fi/Bluetooth antenna 420 is a loop antenna which includes a ground connection.

It is noted that the main antenna 406 and its adjacent left and right hand capacitive sensing segments 410, 414 are separated from the capacitive sensing segments and antennas near the top portion of the UE by relatively long grounded metal segments 409 and 411 establishing a central grounded section of metal segments on both the left and right side of the UE's periphery thereby separating the main antenna both by space and ground plane from the other antennas on the external periphery metal bezel of the UE.

Figure 5:
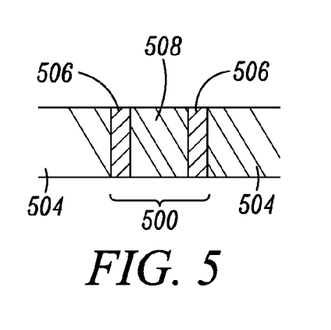
FIG. 5 illustrates an exploded view of an exemplary non-conductive gap or slot in a metal bezel.

One of the exemplary gaps 412, which is circled in FIG. 4, is shown in more detail in FIG. 5. In some embodiments, an exemplary gap or spacer portion 500 interposed between two metal segments 504 of the slotted bezel may comprise two or more non-conductive portions with a conductive or nonconductive portion 508 there between. This exemplary spacer portion 500 provides additional spacing and electrical separation between adjacent metal segments such that if the UE is dropped on a hard surface resulting in damage to or flexing of the metal bezel, there is additional assurance that an electrical connection between adjacent metal segments will not be established. In other embodiments, only a single non-conductive portion is interposed between metal segments.

Figure 6:
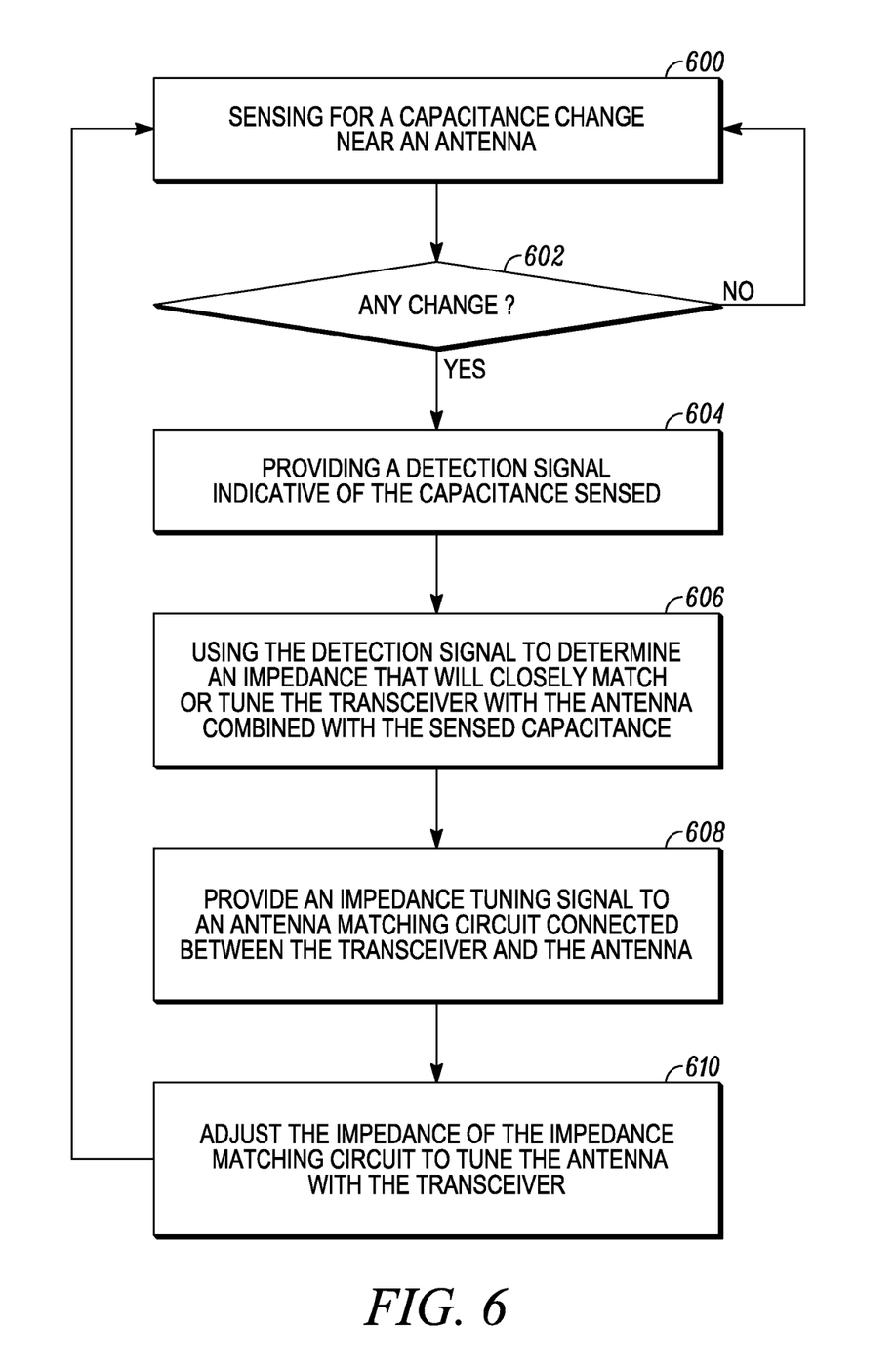
FIG. 6 is a flowchart of a method to tune an antenna when a capacitance that is proximate to an antenna is sensed.

FIG. 6 is a flowchart of an exemplary method for tuning an antenna in the presence of a capacitance being sensed proximate to the antenna. At step 600, a capacitive proximity sensor positioned spaced from and next to an antenna continuously senses for a change in capacitance due to a capacitive touch (or removal of a capacitive touch) by a user or other object. At step 602, it is determined whether any change in capacitance is sensed. In some embodiments, the change in capacitance must be a change of at least a predetermined amount of capacitance that will require retuning of the impedance associated with the antenna in order to help maximize antenna efficiency by minimizing return loss.

If at step 602 no change or no change of a predetermined amount is sensed, then the method returns to step 600. Conversely, if a capacitance change is sensed on the capacitive proximity sensor, then at step 604 a detection signal indicative of the amount of capacitance sensed is provided to the processor within the UE. At step 606, the application processor uses the detection signal to determine which capacitive proximity sensor sensed the capacitance change and to calculate and or look up in a lookup table an appropriate impedance necessary to closely match or tune the transceiver with the antenna (combined with the sensed capacitance or derivation thereof) for the frequency band that the transceiver is transmitting or receiving. At step 608, the processor provides an impedance tuning signal to an antenna matching circuit that is connected between the transceiver and the antenna. The antenna matching circuit is connected directly to the antenna without other electronic elements or electrical connections connected therebetween.

At step 610, the antenna matching circuit adjusts its impedance in accordance with the received impedance tuning signal in order to closely tune the antenna with the transceiver while the detected capacitance is sensed proximate to the antenna. This process loops back to step 600 and once again senses for capacitance changes near the antenna.

Figure 7:
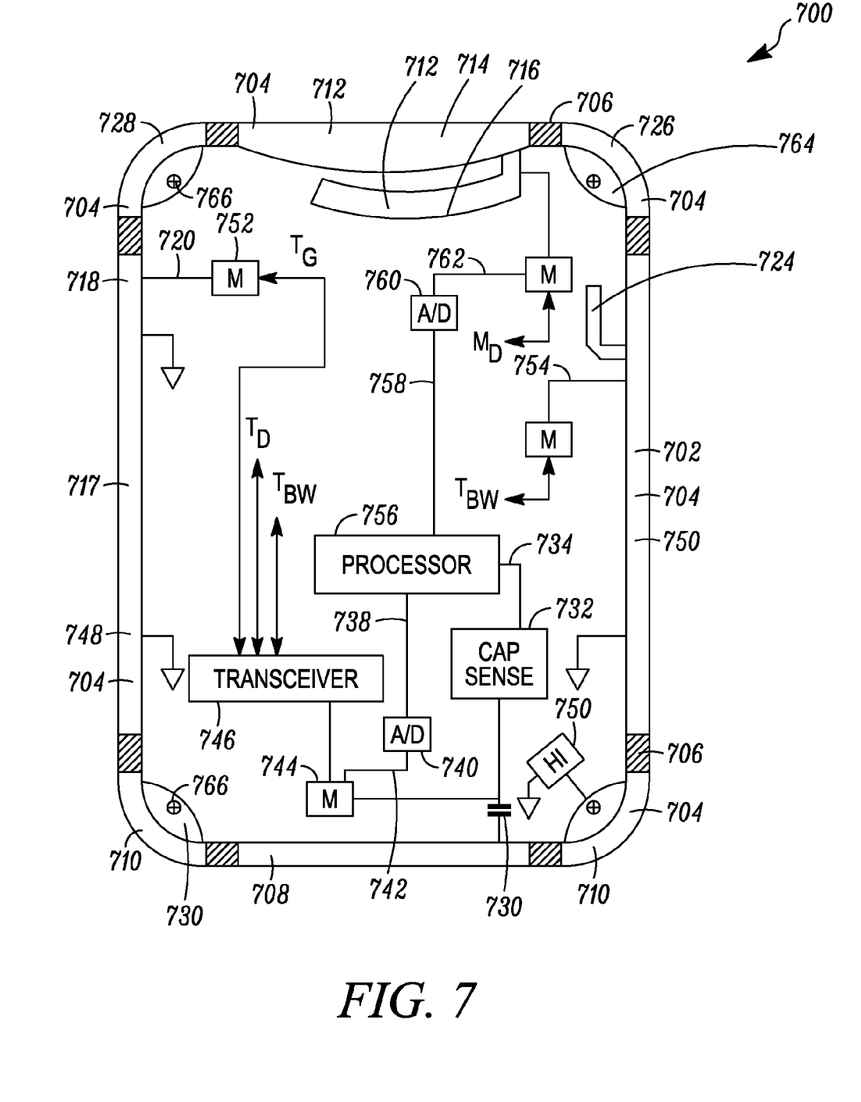
FIG. 7 illustrates an exemplary mobile communication device looking at the backside of the device with the back cover removed, the circuitry as shown in block diagram form.

FIG. 7 illustrates a view of another embodiment of an exemplary mobile communication device (UE) looking at the backside of the device with the back cover removed. The circuitry in FIG. 7 is shown in block diagram form. In this embodiment, the UE 700 has a bezel or peripheral band 702 extending about the periphery of the UE 700 between the front and back sides of the UE. The peripheral band 702 is comprised of a plurality of metal segments 704. The metal segments 704 are separated from each other by a nonconductive spacer portion 706. There are eight metal segments 704 interposed with eight nonconductive spacer portions 706. The bezel 702 has a rectangular configuration with rounded corners. Each rounded corner of the rectangular bezel comprises one of the plurality of metal segments. Also each side of the rectangular bezel configuration comprises one of the plurality of a metal segments. The bottom corner segments 710 are electrically floating metal segments in that they are not electrically connected to any circuitry in the UE 700. In some embodiments, the bottom corner segments may each be connected via a LC circuit or a high impedance circuit (HI) 750 to ground.

A metal segment positioned on a bottom side of the rectangular bezel configuration 702 is configured to be a main antenna 708. The bottom corner metal segments 710 are located on a first side and a second side of the main antenna 708. The bottom corner segments 710 comprise two of the plurality of metal segments 704 of the bezel 702. Another one of the metal segments 704 is positioned on the top side of the rectangular bezel configuration 702 and is a first element 714 of a diversity antenna 712. The diversity antenna 712 comprises two elements being the first element 714 comprising the top side metal segment of the bezel 702 and a second element 716, which is welded or soldered to an inside facing edge of the first element 714 and extends either in a linear or curvilinear direction along a side of the first element 714 inside the UE 700. The second element 716 may be shorter than the first element 714. The first element 714 is configured to operate as a low-frequency arm of the diversity antenna 712 and the second element 716 is configured to operate as a high-frequency arm of the diversity antenna 712. The diversity antenna 712 is thus a dual band diversity antenna.

One side of the rectangular bezel 702 is a first side metal segment 717 that is configured to be a GPS antenna 718. A GPS signal connection 720 is connected near a top end of the GPS antenna 718 while the bottom end of the GPS antenna 718 (the first metal segment 717) is a grounded portion 748. The top end of the GPS antenna 718 is proximate to a top first side corner metal segment 728. In this embodiment, the GPS antenna 718 is a loop antenna such that the central and lower portion of the metal segment 717 is a grounded portion 748. On the other side of the rectangular bezel 702 is a second side metal segment 722, of the plurality of metal segments 704, that is configured to comprise a monopole Bluetooth (BT)/Wi-Fi antenna 724 near the top end of the second side metal segment 722. The monopole BT/Wi-Fi antenna 724 has an open-end facing or proximate to the top second side corner metal segment 726. The BT/Wi-Fi antenna 724 may be a dual inverted-L antenna that supports 2.4 GHz and 5 GHz. The monopole portion 724 of the second side metal segment 722, in some embodiments, is manufactured as part of the same metal segment that makes up the second side metal portion 722. In other words, the monopole portion 724 and the second side metal segment 722 are formed as a single piece of metal.

The top first and second top side corner metal segments 726, 728 are each electrically floating metal segments that are not electrically connected to any circuitry in the UE 700. In some embodiments, the top first and second side corner metal segments 726, 728 are connected via a LC circuit or a high impedance circuit (not specifically shown) to ground.

The eight metal segments 704 consist of the main antenna 708, the two bottom corner metal segments 710, the first side metal segment 717, the top first side corner metal segment 728, the second top side corner metal segments 726, the first element 714 of the diversity antenna 712, and the second side metal segment 722. Each of the eight metal segments 704 are separated by nonconductive spacer portions 706 such that each of the eight metal segments 704 are electrically separated or insulated from each other. Accordingly, there are eight nonconductive spacer portions 706.

Still referring to FIG. 7, the main antenna 708 is connected via a capacitor or capacitive element 730 to a capacitance sensor circuit 732. The capacitance sensor circuit 732 sends a detection signal 734 to the processor 736. The detection signal 734 provides an indication of the capacitance or a change in the capacitance sensed at the first antenna 708 due to a user or other object being in the proximity of or touching the main antenna 708. The processor 736 is configured, for example by running a software application, to perform predetermined calculations and/or use a lookup table to provide a tuning control signal 738 to an analog to digital (A/D) converter 740. The A/D converter 740 converts the digital tuning control signal 738 to an analog tuning signal 742, which is received by a main antenna matching circuit 744. The main antenna matching circuit 744 is tuned in accordance with the received analog tuning signal 742 so as to adjust the impedance between the transceiver 746 and the main antenna 708 to compensate for the sensed capacitance on the main antenna 708 and the frequency band being transmitted or received.

When a user is holding an exemplary mobile device, the user's hand may touch, for example, both the grounded portion of the first side metal segment 717 and the main antenna 708. If the distance between the first side metal segment 748 and the main antenna 708 was limited to only a single nonconductive spacer portion 706 having a width of only a few millimeters, the user's hand may short the main antenna 708 to the first side metal segment 717 and pull the main antenna 708 to ground potential, which would be detrimental to the main antenna's ability to transmit or receive radiofrequency signals. That is the main antenna 708 may not be able to transmit or receive signals when shorted to ground.

Embodiments of the invention isolate the main antenna from being grounded (connected to ground via a low resistance) by user's hand touching both the main antenna and one of the first or second side metal segments 717, 722. The bottom corner segments 710 provide an isolation distance of between about 5 to about 25 mm between the main antenna and either of the first or second side metal segments 717, 722. The isolation distance establishes a high enough resistance or impedance (through the user's hand) when a user is touching either of the first or second side metal segments 717, 722 and the main antenna 708 such that transmission and reception of RF signals on the main antenna 708 can still be accomplished because the main antenna is not grounded.

The bottom corner segments 710 can each be either electrically floating or connected to ground via a high impedance circuit 750. The high impedance circuit 750 may comprise a LC circuit specifically tuned to provide a high impedance within a predetermined frequency band(s), such as the frequency band(s) being transmitted and received on the main antenna 708. The high impedance circuit 750 may act as a band stop filter that provides a high impedance at frequency bands that are normally transmitted and received on the main antenna and a low impedance to other frequencies.

The top first and top second side corner metal segments 726, 728 may be configured similarly to the bottom corner segments 710 discussed above. The top first and top second side corner metal segments 726, 728 are configured to isolate the top antenna, the diversity antenna 712, from the neighboring first and second side metal segments 717, 722. The top first and second side corner metal segments 726, 728 each provide electrical isolation for the diversity antenna 712. Additionally, each of the top first and top second side corner metal segments 726, 728 may be connected to ground via a high impedance circuit (not specifically shown for the top corners) comprising parallel inductive and capacitive components so as to increase the electrical isolation for predetermined frequency bands.

In some embodiments, the four corner metal segments 710, 726, 728 have metal flanges 764 extending toward the interior of the UE 700. The metal flanges 764 may be mechanically secured by a removable fastener or screw 766 to the interior structure (not specifically shown) of the UE 700. Since the bezel or peripheral band 702 extends about the periphery of the UE 700, if the UE is dropped there is a probability that a corner of the UE will impact the floor and be required to absorb the associated impact shock. By fastening the bezel 702 to the interior structure of the UE 700, the bezel 702 will better manage impact shocks. In other embodiments, the bezel 702 may also be mechanically attached to the interior structure of the UE in a plurality of other locations as well (not specifically shown).

In the embodiment shown in FIG. 7, there are eight nonconductive spacer portions 706 interposed between eight metal segments 704 to establish four electrically floating corner sections that electrically isolate the main antenna 708, the GPS 718 antenna and ground portion 748, the diversity antenna 712, and the BT/Wi-Fi antenna 724 and ground portion 722 from each other and from being shorted to ground by a user's hand while holding an exemplary UE 700.

The GPS antenna 718 is connected by the GPS signal line 720 to a GPS antenna matching circuit 752, which in turn is connected to the transceiver circuitry 746. The GPS antenna matching circuit 752 may be a fixed antenna matching circuit that is not adjusted or tuned by other circuitry within the UE 700. Conversely, in some embodiments the GPS antenna matching circuit 752 may be configured to receive a tuning signal originating from the processor 736 to adjust the impedance of the GPS antenna matching circuit 752. Similarly, the BT/Wi-Fi antenna 724 is connected to a BT/Wi-Fi antenna matching circuit 754, which in turn is connected to the transceiver circuitry 746.

The diversity antenna 712 is connected to a diversity antenna matching circuit 756, which in turn is connected to the transceiver circuitry 746. The processor 736 provides a tuning control signal 758 to an A/D converter 760, which converts the control signal 758 to an analog tuning signal 762. The antenna tuning signal 762 is received by the diversity antenna matching circuit 756, which uses the antenna tuning signal 762 to adjust the impedance of the diversity antenna matching circuit 756 to closely match the impedance of the diversity antenna 712 operating at a frequency band (high frequency, low frequency) being transmitted or received on the diversity antenna. It is understood that not all embodiments require a tunable antenna matching circuit between the transceiver circuitry and the associated antenna. The tuners used in the matching circuits may be barium strontium titanate (BST) tunable capacitors, micro-electro-mechanical systems (MEMS) tunable capacitors, field effect transistor (FET) tunable capacitors, or other known or created tunable impedance circuits or switches.

Although the preferred embodiment has been described in detail, it should be understood that various changes, substitutions and alterations can be made therein without departing from the spirit and scope of the invention as defined by the appended claims.

What is claimed is:

1. A mobile communication device comprising:
   a front side and a back side, wherein the front side and back side are configured to attach to each other about each of their perimeters forming a casing having an interior and an exterior;
   circuitry contained within the casing interior, the circuitry comprising:
      a processor;
      a transceiver connected to the processor;
      an antenna impedance matching circuit connected to the transceiver; and
      a capacitance sensor circuit connected to the processor;
   a perimeter band attached to and extending substantially about the perimeter of at least one of the front side and the back side, the perimeter band comprising:
   a plurality of metal segments comprising:
      a first metal segment having a first end and a second end, the first metal segment configured to be a main antenna for the mobile communication device, the first metal segment being electrically connected directly to the antenna matching circuit; and
      a second metal segment adjacent to the first end of the first metal segment, the second metal segment configured to be a first capacitive sensor, the second metal segment connected via a first capacitance element to the capacitance sensor circuit; and
   a plurality of spacer portions interleaved with the plurality of metal segments, each spacer portion comprising a non-conductive portion configured to electrically separate the plurality of metal segments.

2. The mobile communication device of claim 1, wherein the plurality of metal segments further comprises a third metal segment adjacent to the second end of the first metal segment, the third metal segment configured to be a second capacitive sensor, the third metal segment connected via a second capacitance element to the capacitance sensor circuit.

3. The mobile communication device of claim 1, wherein the second metal segment is positioned on the perimeter band such that a user's right hand will touch the second metal segment when the mobile device is held in the user's right hand with the front side is facing the user.

4. The mobile communication device of claim 1, wherein the capacitive sensing circuit is configured to provide a detection signal to the processor upon sensing a capacitance change from the first capacitive sensor.

5. The mobile communication device of claim 1, wherein the processor is configured to provide the antenna impedance matching circuit a tuning control signal and wherein the antenna impedance matching circuit adjusts its impedance closely match the impedance of the main antenna with the transceiver.

6. The mobile communication device of claim 1, wherein the plurality of metal segments further comprises:
   a volume up metal segment connected via a third capacitive element to the capacitance sensor circuit; and
   a volume down metal segment connected via a fourth capacitive element to the capacitance sensor circuit;
   wherein the capacitance sensor circuit is configured to provide a volume up detection signal to the processor when sensing a predetermined capacitance change on the volume up metal segment; and
   wherein the capacitance sensor circuit is configured to provide a volume down detection signal to the processor when sensing a predetermined capacitance change on the volume down metal segment.

7. The mobile communication device of claim 1, wherein the plurality of metal segments further comprises:
   a Global Positioning System (GPS) antenna metal segment configured to receive GPS frequency bands;
   a Wi-Fi/Bluetooth antennal metal segment configured to send and receive Wi-Fi and Bluetooth frequency bands.

8. The mobile communication device of claim 2, wherein the plurality of metal segments further comprises:
   a first ground metal segment adjacent to the second metal segment and opposite the main antenna, the first ground metal segment being connected to a ground of the circuitry;
   a second ground metal segment adjacent to the third metal segment and opposite the main antenna, the second ground metal segment being connected to the ground of the circuitry; and
   wherein the first and second ground metal segments separate the first, second and third metal segments from other ones of the plurality of metal segments.

9. The mobile communication device of claim 8, wherein the other ones of the plurality of metal segments comprise:
   a secondary antenna metal segment configured to operate as at least one of a diversity antenna and a multiple-in and multiple-out (MIMO) antenna.

10. A mobile communication device comprising:
    a casing comprising a front side, a back side, and a perimeter edge about the communication device where the front side and back side meet;
    circuitry contained with the casing, the circuitry comprising:
       a processor;
       a transceiver connected to the processor;
       an antenna matching circuit connected to transceiver;
       a capacitance sensor circuit connected to the processor;
       a perimeter bezel about the perimeter edge, the perimeter bezel comprising:
    a plurality of metal segments each separated by a non-conductive spacer portion, the plurality of metal segments comprising:

a main antenna segment configured to send and receive long range mobile communication signals, the main antenna segment having a first end and a second end, the main antenna electrically connected directly to the antenna matching circuit;

a right side capacitance sensor segment positioned next to the first end of the main antenna segment and connected to the capacitance sensor circuit via first capacitor;

a left side capacitance sensor segment positioned next the second end of the main antenna segment and connected to the capacitance sensor circuit via a second capacitor;

wherein the capacitance sensor is configured to provide the processor a capacitance detection signal when a capacitance change is sensed from either the right side or the left side capacitance sensor segments; and wherein the processor, upon receipt the capacitance detection signal, is configured to provide a tuning control signal to the antenna matching circuit to tune the antenna matching circuit in accordance with the sensed capacitance change from either the right side or the left side capacitance sensor segments.

11. The mobile communication device of claim 10, wherein:

the right side capacitance sensor segment is positioned on the perimeter bezel such that the right side capacitance sensor has a high probability of touching a user's hand when the user is holding the mobile communication device in the user's right hand and looking at the front side; and the left side capacitance sensor segment is positioned on the perimeter bezel such that the left side capacitance sensor has a high probability of touching the user's hand when the user is holding the mobile communication device in the user's left hand and looking at the front side.

12. The mobile communication device of claim 10, wherein the right side capacitance sensor segments and the left side capacitance sensor segments can also be configured to function in accordance with user selected applications that operate on the mobile communication device.

13. The mobile communication device of claim 10, wherein the circuitry further comprises a second capacitance sensor circuit; and wherein the plurality of metal segments further comprises:
a volume up capacitance sensor connected to a second capacitance sensor circuit via a third capacitor; and
a volume down capacitance sensor connected to a second capacitance sensor circuit via a fourth capacitor; and
wherein the second capacitance sensor circuit is configured to provide a volume up detection signal to the processor when sensing a predetermined capacitance change on the volume up capacitance sensor segment; and
wherein the capacitance sensor circuit is configured to provide a volume down detection signal to the processor when sensing a predetermined capacitance change on the volume down capacitance sensor segment.

14. The mobile communication device of claim 13, wherein the capacitance sensor circuit comprises the second capacitance sensor circuit.

15. The mobile communication device of claim 10, wherein the plurality of metal segments further comprises:
a first grounded metal segment adjacent to the right side capacitance sensor segment, the first grounded metal segment being connected to a ground of the circuitry;
a second grounded metal segment adjacent to the left side capacitance sensor segment, the second grounded metal segment being connected to the ground of the circuitry; and
wherein the first and second grounded metal segments separate the right side capacitance sensor segment, the left side capacitance sensor segment, and the main antenna segment from other ones of the plurality of metal segments of the perimeter bezel.

16. A method of matching the impedance between a transceiver and an antenna positioned on and flush with an exterior periphery of a mobile communication device, the antenna having a first end and a second end, the method comprising:
sensing, by a capacitance sensor circuit connected to capacitance sensors adjacent to the first end and second end of the antenna, that the capacitance of one of the capacitance sensors has changed;
providing, by the capacitance sensor circuit, a capacitance detection signal to a processor when the capacitance change is sensed by the capacitance sensor circuit;
determining and providing by the processor an impedance tuning signal to an antenna matching circuit based on the capacitance detection signal;
adjusting the impedance of the antenna matching circuit to better match the impedance between the transceiver and the antenna, wherein the antenna is directly electrically connected to the antenna matching circuit.

17. The method of claim 16, wherein the antenna and the capacitance sensors adjacent to the first end and second end of the antenna are each comprised on a metal bezel extending about and flush with the exterior periphery of the mobile communication device and each being separated by non-conductive spacer portions.

18. A mobile communication device comprising:
a perimeter band extending about a periphery of the mobile communication device, the perimeter band comprising:
eight metal segments interposed with eight non-conductive spacer portions, such that each of the eight metal segments are electrically insulated from each other;
wherein every other one of the eight metal segments comprises a different antenna; and wherein each of the remaining ones of the eight metal segments establishes an isolation distance of between about 5 to 25 mm between the metal segments comprising the different antennas.

* * * * *